(12) United States Patent
Kawabata

(10) Patent No.: US 9,792,388 B2
(45) Date of Patent: Oct. 17, 2017

(54) PATTERN EXTRACTION APPARATUS AND CONTROL METHOD THEREFOR

(71) Applicant: CANON KABUSHIKI KAISHA, Tokyo (JP)

(72) Inventor: Takayuki Kawabata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 14/146,371

(22) Filed: Jan. 2, 2014

(65) Prior Publication Data

US 2014/0201133 A1    Jul. 17, 2014

(30) Foreign Application Priority Data

Jan. 11, 2013  (JP) .................. 2013-003111

(51) Int. Cl.
| | | |
|---|---|---|
| *G06F 17/30* | (2006.01) | |
| *G06K 9/62* | (2006.01) | |
| *G06K 9/68* | (2006.01) | |
| *G06Q 30/02* | (2012.01) | |

(52) U.S. Cl.
CPC ..... *G06F 17/30958* (2013.01); *G06K 9/6296* (2013.01); *G06K 9/6892* (2013.01); *G06Q 30/0201* (2013.01)

(58) Field of Classification Search
CPC .............................................. G06F 17/30958
See application file for complete search history.

(56) References Cited

U.S. PATENT DOCUMENTS

| | | | | |
|---|---|---|---|---|
| 8,626,835 B1* | 1/2014 | Gyongyi | ........... | G06F 17/30598 709/204 |
| 2009/0265336 A1* | 10/2009 | Suntinger | ......... | G06F 17/30985 |
| 2010/0115001 A1* | 5/2010 | Soules | .................. | G06F 17/301 707/821 |

(Continued)

FOREIGN PATENT DOCUMENTS

JP    3373716 B    11/2002

OTHER PUBLICATIONS

Srikant, et al., "Mining Sequential Patterns: Generalizations and Performance Improvements", in proceedings of International Conference on Extending Database Technology, pp. 1-15, 1996.

(Continued)

*Primary Examiner* — Apu Mofiz
*Assistant Examiner* — Dara J Glasser
(74) *Attorney, Agent, or Firm* — Carter, DeLuca, Farrell & Schmidt, LLP

(57) ABSTRACT

A pattern extraction apparatus for extracting a pattern of event occurrence from event time-series data generates an adjacent event graph by fetching adjacent events from the event time-series data, representing each of the adjacent events as a node, connecting the nodes by a directed link having a transition direction between the adjacent events and a weight, representing identical events as a single node, and, if there are a plurality of directed links between identical adjacent events, accumulating weights of the directed links into a single directed link. The pattern extraction apparatus cuts a directed link having an evaluation value smaller than or equal to a predetermined value in the generated adjacent event graph, the expected value being obtained based on the weight of the directed link.

9 Claims, 11 Drawing Sheets

(56) References Cited

U.S. PATENT DOCUMENTS

| | | | |
|---|---|---|---|
| 2010/0241647 A1* | 9/2010 | Ntoulas | G06F 17/30528 707/765 |
| 2010/0251210 A1* | 9/2010 | Amaral | G06F 11/3604 717/105 |
| 2010/0332911 A1* | 12/2010 | Ramananda | G06F 11/3447 714/45 |

OTHER PUBLICATIONS

Pei, et al., "Prefix Span: Mining Sequential Patterns Efficiently by Prefix Projected Pattern Growth", in proceedings of International Conference on Data Engineering, pp. 1-10, 2001.

Mannila, et al., "Discovery of frequent episodes in event sequences", Data Mining and Knowledge Discovery, 1(3): pp. 259-289, 1997.

Achar, et al., "Discovering injective episodes with general partial orders", Data Mining and Knowledge Discovery, vol. 25, Issue 1, pp. 67-108, Jul. 2012.

* cited by examiner

F I G. 1
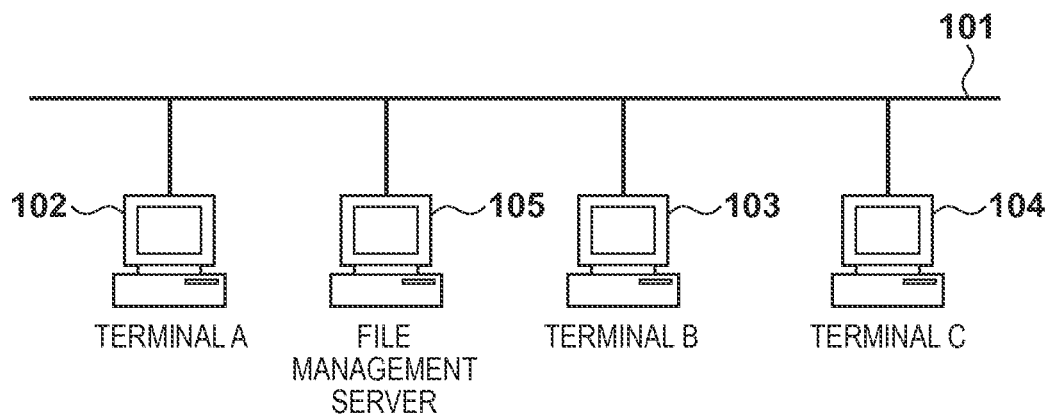
F I G. 2
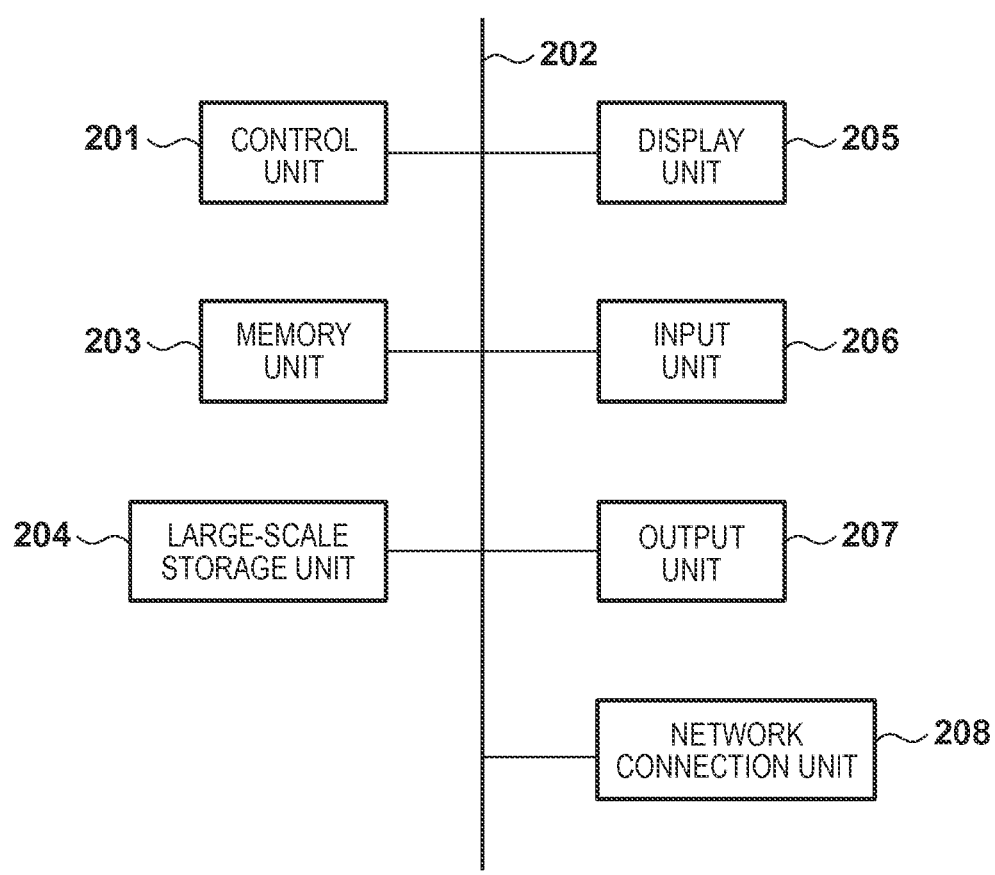

FIG. 4

| LOG ID | TIME | USER ID | FILE ID | OPERATION EVENT |
|---|---|---|---|---|
| 45165 | 2010-06-09T05:00:15 | 1000 | 1544345 | open |
| 45166 | 2010-06-09T05:00:29 | 1000 | 4245646 | print |
| 45167 | 2010-06-09T05:05:29 | 2000 | 1235466 | open |
| 45168 | 2010-06-09T06:00:29 | 2000 | 1476325 | open |
| 45169 | 2010-06-09T06:00:46 | 1000 | 2335486 | open |
| 45170 | 2010-06-09T06:10:29 | 3000 | 2443585 | update |

401 402 403 404 405

| LOG ID | TIME | EVENT ID |
|---|---|---|
| 1000 | 2010-06-09 10:21:15 | A |
| 1001 | 2010-06-09 10:40:29 | B |
| 1100 | 2010-06-09 11:29:59 | G |
| 1101 | 2010-06-09 11:33:20 | B |
| 1102 | 2010-06-09 11:40:46 | A |
| 1200 | 2010-06-09 13:43:38 | E |
| 1201 | 2010-06-09 13:59:02 | C |
| 1202 | 2010-06-09 14:15:25 | D |
| 1300 | 2010-06-10 10:38:19 | A |
| 1301 | 2010-06-10 10:40:08 | B |
| 1400 | 2010-06-10 16:43:06 | C |
| 1401 | 2010-06-10 16:58:42 | D |
| 1500 | 2010-06-10 17:59:01 | B |
| 1501 | 2010-06-10 18:21:51 | A |
| ... | ... | ... |

| EVENT ID | FILE ID | OPERATION |
|---|---|---|
| A | 1 | Open |
| B | 4 | Open |
| C | 3 | Update |
| D | 1 | Update |
| E | 5 | Open |
| ... | ... | ... |

F I G. 10A
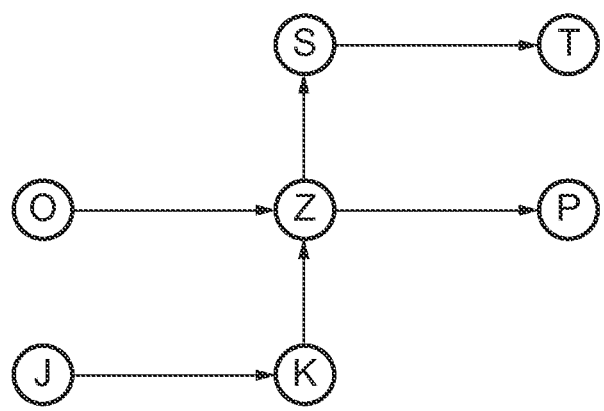
F I G. 10B
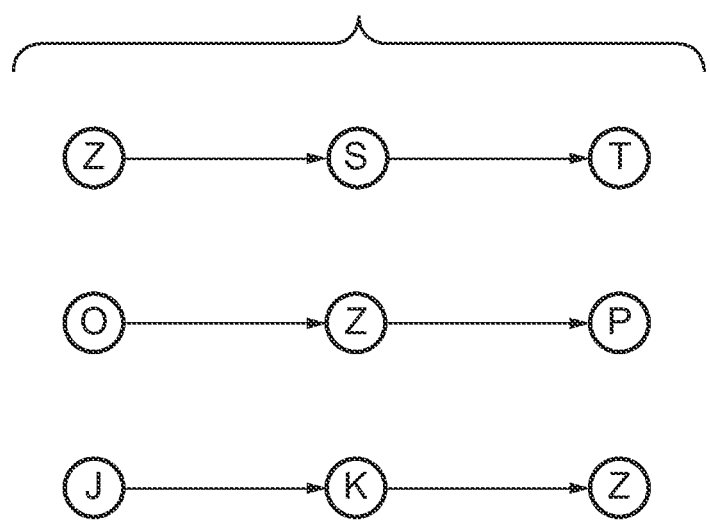

PATTERN EXTRACTION APPARATUS AND CONTROL METHOD THEREFOR

BACKGROUND OF THE INVENTION

Field of the Invention

The present invention relates to a pattern extraction apparatus suitable for extracting a frequent pattern from time-series data, and a control method for the same.

Description of the Related Art

There is a need for a method for analyzing enormous amount of data arranged in time series thereby to extract useful patterns embedded in the data. For example, with the basket analysis, a customer purchasing pattern such as "a customer who purchased Product A and then purchased Product B will subsequently purchase Product C", can be known from POS data and customer information. This pattern can be utilized for creating a product sales strategy. Also, a typical file operation pattern of a given user can be known from a file operation log at the office, and this can be utilized for the recommendation for file operations, for example.

Sequential pattern mining is known as a mining technique for time-series data. Exemplary methods of sequential pattern mining are described in: Japanese Patent No, 3373716; R. Agrawal, R. Srikant, "Mining Sequential Patterns: Generalizations and Performance Improvements", in proceedings of International Conference on Extending Database Technology, 1996; and J. Pei, J. Han, A. Behzad, H. Pinto, "Prefix Span: Mining Sequential Patterns Efficiently by Prefix Projected Pattern Growth", in proceedings of International. Conference on Data Engineering, 2001. These conventional methods extract, from a database comprising items and time stamps (times) or identifiers indicating the order of occurrence, a time-series pattern having a support with a value that is greater than or equal to a minimum value (minimum support) of the support (ratio of the frequency of occurrence to all data) that is set by a user in advance. The support of a given time-series pattern is the proportion of data containing that time-series pattern in the entire database. A time-series pattern having a support greater than or equal to a minimum support is called a frequent time-series pattern. For the extraction of frequent time-series pattern, many methods have been proposed that involve repetition of the creation of time-series patterns serving as candidates (candidate time-series patterns) and the counting of the frequency of the candidate time-series patterns appearing in the database by database scanning. Such methods are called apriori-based methods. These conventional techniques extract time-series patterns in which the order of occurrence of the data in de database is directly captured.

However, as a time-series pattern contained in the actual data, not only fully ordered time-series Patterns in which the order of occurrence is directly captured, but also many time-series patterns containing a partially ordered relation, which have no order, exist. Further, in sequential pattern mining, only a plurality of pieces of time-series data are subjected to analysis. That is, in the above-described example of the basket analysis, a characteristic pattern observed for some of a plurality of persons can be extracted from the purchase data of these persons, but a characteristic pattern appearing several times in the purchase data of a single person cannot be extracted. In that case, the purchase data of a single person needs to be divided into a plurality of data pieces in some way for analysis.

In view of this problem of sequential pattern mining, the technique called episode mining has been proposed. In episode mining, the type of data is called an event, and an event sequence in which events are arranged in order of their times of occurrence serves as an input. The goal of episode mining is to extract a frequent partial event sequence, which is called an episode, from this event sequence. Episodes can be roughly classified into a serial episode in which the order of events is fully decided, a parallel episode in which there is no order between events, and a general episodes, which is a combination of the serial episode and the parallel episode. In the case of an episode containing events A, B, and C, the parallel episode can be denoted as (A, B, C), the serial episode can be denoted as A→B→C, and the general episode can be denoted as (A, B)→C, for example. This episode mining technique was proposed by H. Mannila, H. Toivonen, and A. I. Verkamo, "Discovery of frequent episodes in event sequences", Data Mining and Knowledge Discovery, 1(3): 259-289, 1997. Many other episode mining techniques have thereafter been proposed. Many of the proposed techniques, however, can only extract serial episodes or parallel episodes. General episodes are broader, general-purpose episodes, including serial episodes and parallel episodes, and thus, there is a need for methods for extracting such general episodes as practically useful patterns.

One method for extracting the above-described general episode is described by Avdnash Achar, Srivatsan Laxman, Raajay Viswanathan, P. S. Sastry, "Discovering injective episodes with general partial orders", Data Mining and Knowledge Discovery, Volume 25, Issue 1, pp 67-108, July 2012. This document proposes an apriori-based method, similarly to the above-described technique of sequential pattern mining. The point of this method is the creation of general episodes serving as candidates. According to this document, all episode pairs that satisfy conditions are fetched from a set of frequent general episodes each having a size of n, and a general episode is created by merging these pairs. Three sets of candidate general episodes each having a size of n+1 are generated for each pair, and finally, those satisfying constraints are generated as a set of candidate general episodes each having a size n+1.

A major problem of the method described in this document is that depending on the number of event types, the length of the input event, sequence, and the minimum support, the number of potential general episodes is increased enormously due to combinatorial explosion, and thus it takes a significant time to perform the frequency calculation by database scanning. For example, the number of potential candidate episodes for an episode having a length of 3 when there are ten types of events will be 120 for the parallel episode, 720 for the serial episode, and 2280 for the general episode. For actual data, it is hardly a case that the number of event types is 10, and it is more often the case that there are 100 or more event types. In that case, combinatorial explosion makes it difficult to perform pattern extraction within a realistic time period.

SUMMARY OF THE INVENTION

According to an embodiment of the present invention, it is possible to provide a system and an apparatus capable of extracting a pattern of event occurrence at high speed even if the number of event types and the length of the event sequence contained in time-series data are large.

According to one aspect of the present invention, there is provided a pattern extraction apparatus for extracting a pattern of event, occurrence from event time-series data, comprising: a generation unit configured to generate an adjacent event graph by fetching adjacent events from the event time-series data, representing each of the adjacent events as a node, connecting the nodes by a directed link having a transition direction between the adjacent events and a weight, representing identical events as a single node, and, if there are a plurality of directed links between identical adjacent events, accumulating weights of the directed links into a single directed link; and a cutting unit configured to cut a directed link having an evaluation value smaller than or equal to a predetermined value in the adjacent event graph, the expected value being obtained based on the weight of the directed link.

According to another aspect of the present invention, there is provided a method for controlling pattern extraction apparatus for extracting a pattern of event occurrence from event time-series data, comprising the steps of: generating an adjacent event graph by fetching adjacent events from the event time-series data, representing each of the adjacent events as a node, connecting the nodes by a directed link having a transition direction between the adjacent events and a weight, representing identical events as a single node, and, if there are a plurality of directed links between identical adjacent events, accumulating weights of the directed links into a single directed link; and cutting a directed link having an evaluation value smaller than or equal to a predetermined value in the adjacent event, graph, the expected value being obtained based on the weight of the directed link.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram showing an exemplary system configuration according to an embodiment.

FIG. 2 is a diagram showing an exemplary configuration of an apparatus according to an embodiment.

FIG. 4 is a diagram showing an exemplary file operation history according to an embodiment.

FIG. 10A is a diagram showing an example of pattern combination according to an embodiment.

FIG. 10B is a diagram showing an example of event separation according to an embodiment.

DESCRIPTION OF THE EMBODIMENTS

Figure 3:
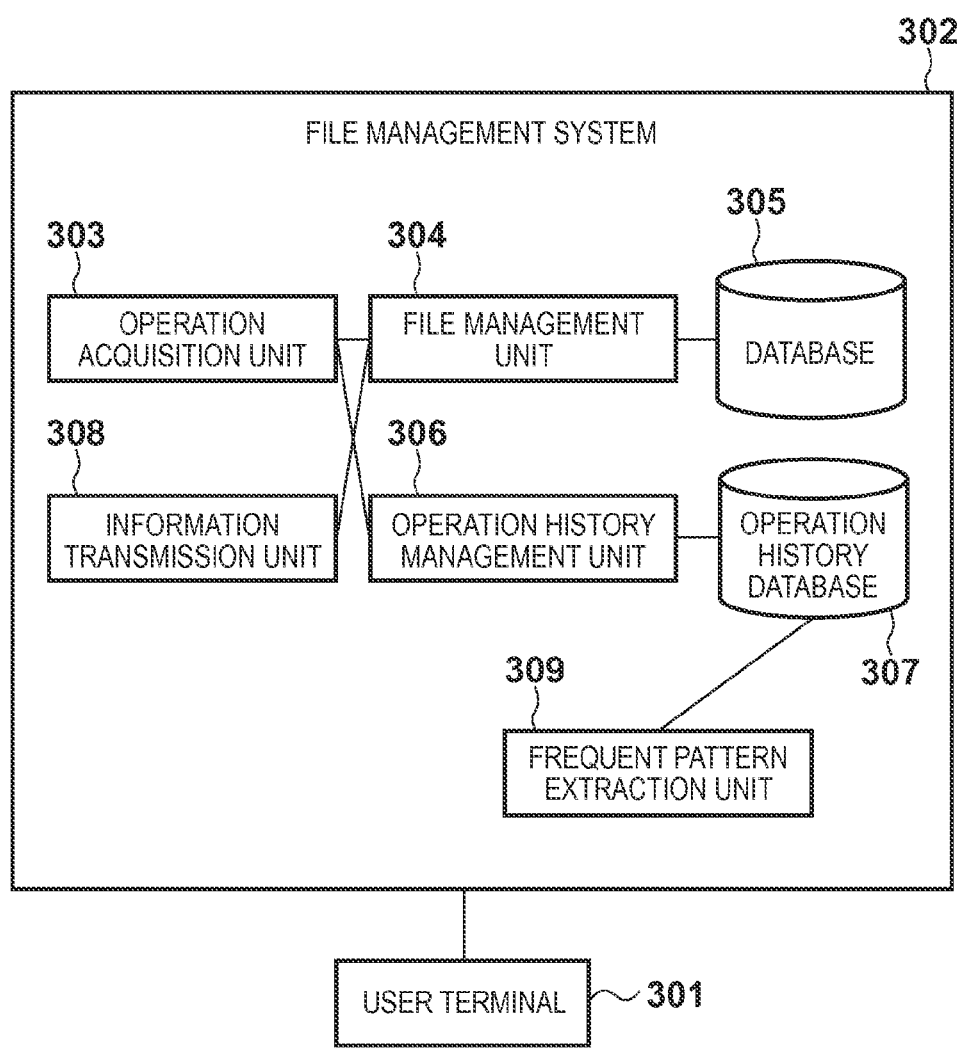
FIG. 3 is a block diagram showing a functional configuration according to an embodiment.

Hereinafter, preferred embodiments of the present invention will be described with reference to the accompanying drawings.

First Embodiment

An exemplary frequent pattern extraction method according to a first embodiment will be described with reference to the drawings. In the present embodiment, a file operation is regarded as an event, and a frequent pattern extraction function is provided as one function of a file management system. An extracted frequent pattern can be utilized for the recommendation for the user file operation, the improvement of business operations through pattern visualization, and the detection of abnormal behavior, for example. Note that a file operation is regarded as an event in the present embodiment, but the present invention is not limited thereto. The present invention is applicable to any sequence data even if it is discrete data or continuous data by regarding all of these data as an event. For example, continuous data can be converted into discrete data by dividing continuous values into appropriate ranges, and assigning an appropriate identifier to each range. A wide range of other examples of the utilization of the frequent pattern extraction include the detection of the cause of a failure from a failure log at a factory, the prediction of user behavior from a Web operation history, the analysis of seismic data, the detection of intrusion, operational assistance based on an operation history of an imaging apparatus or a printing apparatus.

A file management system, which is an exemplary system configuration according to the present embodiment, will be described with reference to FIG. 1. The file management system is implemented as a client-server model. A terminal A 102, a terminal B 103, a terminal C 104, and a file management server 105 are connected via a network 101, and exchange various information with each other. Each user can use a dedicated client, tool on the terminal A 102, the terminal B 103, or the terminal C 104 to perform file operations such as registration, viewing, and deletion of files.

FIG. 2 is a block diagram showing an exemplary configuration of each of the devices (the terminal. A 102, the terminal B 103, the terminal. C 104, and she file management server 105) constituting the file management system shown in FIG. 1. In FIG. 2, a control unit 201 is configured of a CPU or she like, and is connected, via a bus 202, to a memory unit 203, a large-scale storage unit 204, a display unit 205, an input, unit 206, an output unit 207, and a network connection unit 208. The memory unit 203 is an electronic storage device configured of a RAM or the like. The control unit 201 operates according to a program and data that are disposed in the memory unit 203, and controls various units connected thereto via the bus 202 to perform data input/output. The largo-scale storage unit 204 is a data storage device such as a hard disk or an optical disk.

The display unit 205 includes a display device that displays a document and the like to a user using the present system. The input unit 206 includes a pointing device such as a mouse, a stick, or a pad for inputting instructions in conjunction with the display content of the display unit 205. Alternatively, a device serving both as the display unit 205 and the input unit 206, such as a display provided with a touch panel function, may be used. The output unit 207 outputs data under control of the control unit 201. For example, the output unit 207 is an interface for outputting data to an external device, and a printer device, or the like that provide a visual, output of data on a sheet of paper can be connected to the output unit 207. The network connection unit. 208 is a network interface for receiving and transmitting data from and to the outside of the device via the network 101.

Note that the units shown in FIG. 2 may be each configured as a separate general-purpose computer such as a PC, or may be constructed within an electronic device such as an MFP. Alternatively, they may be constructed as a set of a plurality of computers and servers connected to each other, and peripheral devices such as display and a PDA.

FIG. 3 is an exemplary block diagram showing a functional configuration for implementing the processing performed in the file management server 105. Reference numerals 303 to 309 denote programs for allowing the control unit 201 in FIG. 2 to perform predetermined functions in cooperation with the units 202 to 208. In the present embodiment, the file management server 105 is provided with a file management system 302, and a user terminal 301 is provided with a client tool (not shown). The file management system 302 includes an operation acquisition unit 303, a file management unit 304, a database 305, an operation history management unit 306, an operation history database 307, an information transmission unit. 308, and a frequent pattern extraction unit 309 serving as a workflow extraction unit. Note that the present embodiment adopts a configuration in which the workflow extraction function is incorporated into the file management system 302, but the present invention is not limited, thereto. These functions may be each implemented as a separate unit, or may be implemented in a configuration in which they are incorporated into another system.

Next, the processing performed in the units shown in FIG. 3 will be described. The e operation acquisition unit 303 receives file operation information that has been input from the client tool on the user terminal 301, and sends the file operation information to the file management unit 304 and the operation history management unit 306.

The file management unit 304 receives the file operation information from the operation acquisition unit 303, and performs predetermined file operation processing based on the file operation information in cooperation with the database 305. As used herein, a file operation refers to, for example, a new registration, opening, copying, or deletion of a file, and an operation performed on a folder, and the details of the processing are the same as those of a commonly used file management system. The information regarding the result of the processing is sent to the user terminal 301 via the information transmission unit 308, and is provided to the client tool on the user terminal 301. The database 305 stores and acquires, for example, the information regarding files and folders managed in the file management system 302 and the information regarding the user using the file management system 302.

The operation history management unit. 306 receives the file operation information from the operation acquisition unit. 303, and stores the file operation information in the operation history database 307 as a file operation history. FIG. 4 shows an example of the file operation information registered in the operation history database. 307 as the file operation history. A log ID 401 is a symbol for uniquely identifying file operation information. A time 402 represents information regarding the time at which a file operation was performed. A user ID 403 is information for identifying the user who performed a file operation. A file ID 404 is information for identifying a file on which an operation was performed. An operation event 405 represents the type of a file operation event performed. Note that the file operation information listed here is merely an example, and the present invention is not limited thereto. Hereinafter, the statements regarding operations performed on files may be omitted in order to simplify the illustration. However, a file and an operation performed thereon are indeed handled as a set. Thus, if there is a match between file operations, this means that there is a match both between files and between the operations performed on the files.

The frequent pattern extraction unit 309 acquires an operation history from the operation history database 307, and extracts a frequent file operation pattern by analyzing the operation history. The file, operation pattern extracted here can be useful for the improvement of business operations by being visualized, as a workflow, and for the recommendation of a file operation to the user following the workflow.

Figure 5:
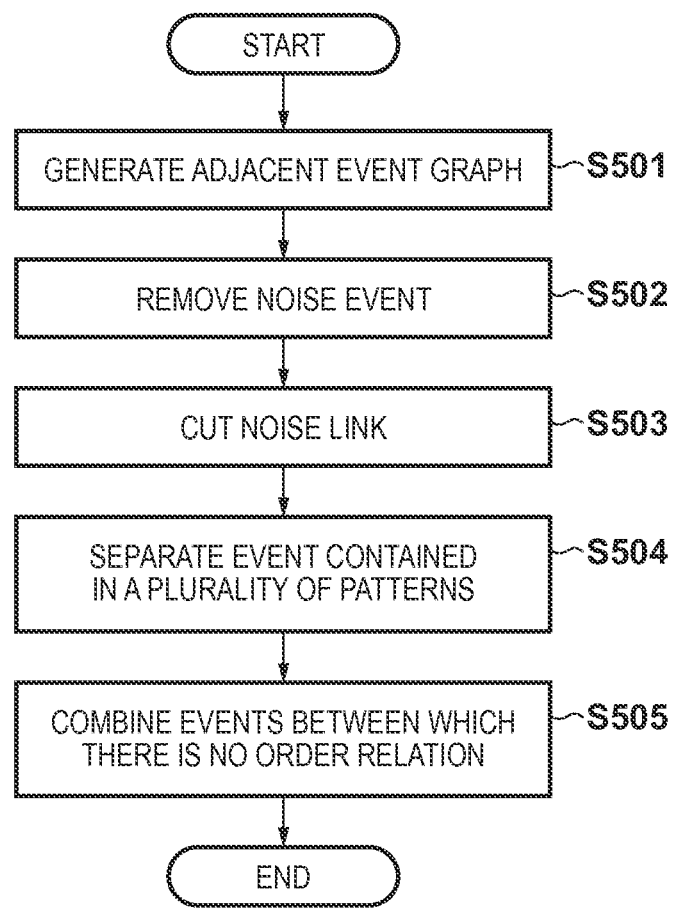
FIG. 5 is a flowchart of frequent pattern extraction according to an embodiment.

Next, the processing for the frequent pattern extraction performed by the frequent pattern extraction unit 309 will be described with reference to the flowchart of FIG. 5. This flowchart is implemented by the CPU of the control unit 201 executing a control program stored in the memory unit 203.

Figures 6A, 6B, 6C:
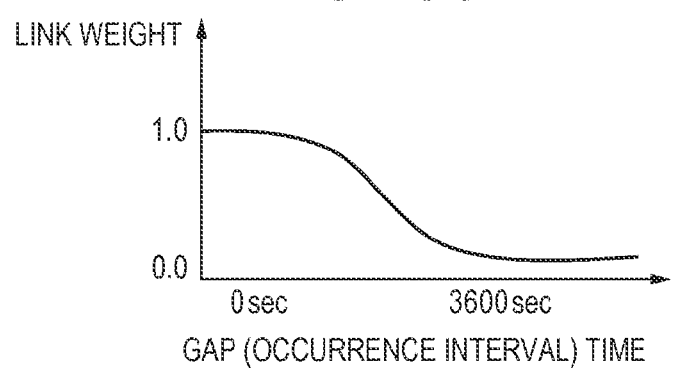
FIG. 6A shows an exemplary file operation history according to an embodiment.
FIG. 6B shows an exemplary file operation history according to an embodiment.
FIG. 6C shows an exemplary link weight function according to an embodiment.

In step S501, the control unit 201 reads the file operation history from the operation history database 307, and creates an adjacent event graph. The method for creating the adjacent event graph will be described with reference to FIGS. 6A to 7C. FIG. 6A shows part of the file operation history of a given user. An event ID is managed using an event table as shown in FIG. 61B, and enables a file ID and an operation to be uniquely identified as a set.

First, the control unit 201 reads out two records arranged one behind the other from the beginning of the file operation history. In the example in FIG. 6A, the records (events) with log IDs 1000 and 1001 are read out first. Then, the control unit 201 represents each of these adjacent events as a node, and connects these nodes to each other by a directed link having a transition direction between the events and a weight. First, the control unit 201 calculates a link weight between the events from the difference in the time of occurrence (gap time) between these two records. Preferably, the link weight increases as the length of the gap time decreases, and lowers as the length of the gap time increases. For example, it is possible to use a sigmoid function as shown in FIG. 6C that nonlinearly changes according to the gap time, or use a reciprocal of the gap time. Alternatively, it is possible to use a constant (fixed value) without using the gap time.

Figure 7A:
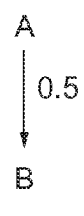
FIGS. 7A to 7D are diagrams showing creation of exemplary adjacent event graphs according to an embodiment.
Figure 7B:
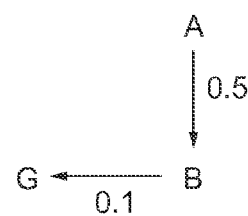
Figure 7C:
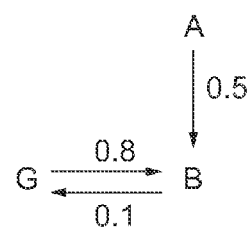
Figure 7D:
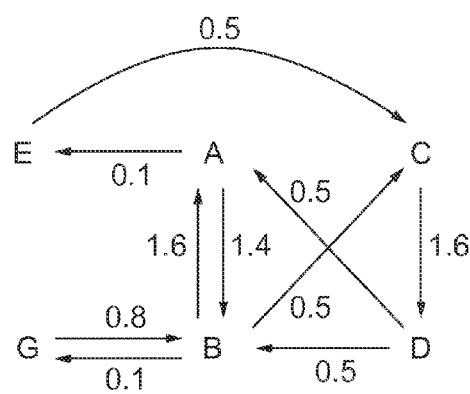

Then, as shown in FIG. 7A, the control unit 201 creates an adjacent event graph by representing the events as nodes, creating a directed link according to the order of occurrence, and providing each link with a link weight determined from the gap time. Thereafter, the same processing is repeated while moving to the next record one by one. At that time, the control unit 201 represents identical events as a single node. If a Plurality of directed links exist between identical adjacent events, these links are represented as a single directed link by accumulating the weights of the links. Through this processing, an adjacent event graph as shown in FIG. 7B is created from a record that is read next, an adjacent event graph as shown in FIG. 7C is created from a record that is subsequently read, and an adjacent event graph as shown in FIG. 7D is finally created by reading the records to the record with a log ID 1501.

In step 1502, the control unit 201 removes a noise event from the adjacent event, graph created in step 1501. In the present embodiment, only the front-to-back relation is considered as the connection between events. Accordingly, there is a higher possibility that an inherent connection between events cannot be found when many noise events that accidentally occur are contained in an operation history. Therefore, the removal of noise events is performed in the manner described below.

Figure 8A:
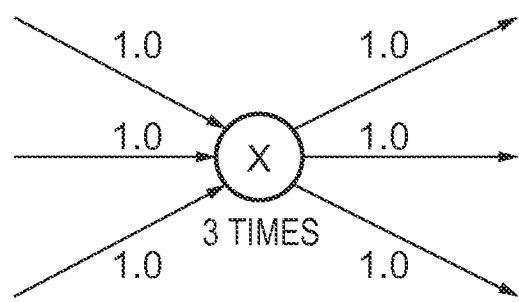
FIGS. 8A and 8B are diagrams showing exemplary noise events according to an embodiment.
Figure 8B:
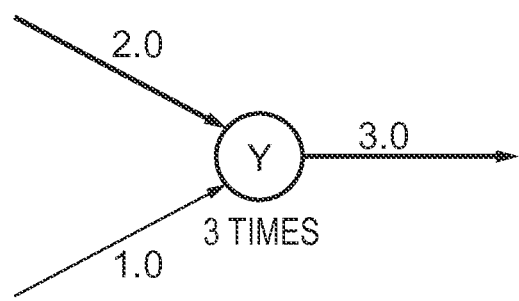

First, the definition of a noise event, will be described with reference to FIGS. 8A and 8B. FIGS. 8A and 8B show part of an adjacent event graph created when a given operation history was read. It can be seen that an event X in FIG. 8A occurs three times in the operation history, three types of events occurred before the event X, and three types of events occurred also after the event X. Further, the link weights are equal regardless of the events to which she links are connected. The event X having a weak connection to a specific event in this way cannot be considered as a frequent pattern, and thus is regarded as a noise event. Conversely, as an event Y in FIG. 8B, an event after which a specific event occurs can be considered as an event contained in a frequent pattern. From the above-described definition of the noise event, the noise score of an event $e_i$, for example, is obtained by the following equation:

$$NoiseScore(e_i) = \min\left(-\frac{\sum_{j \in Inlink_i} p_j \log_2 p_j}{\log_2 \frac{1}{N_i}}, -\frac{\sum_{j \in Outlink_i} q_j \log_2 q_j}{\log_2 \frac{1}{N_i}}\right) \quad (1)$$

where $N_i$ represents the number of occurrences of the event $e_i$, and $Inlink_i$ and $Outlink_i$ respectively represent a set of Inlink and a set of Outlink that are connected to the event $e_i$. Additionally, $p_j$ is a value obtained by dividing the link weight of $link_j$ by the sum of the link weights of all links included in $Inlink_i$, and $q_j$ is a value obtained by dividing the link weight of $link_j$ by the sum of the link weights of all links included in $Outlink_i$. This noise score is calculated for each of Inlink and Outlink, and the smaller noise score is used as the noise score for the corresponding event. This is to prevent an increase in the noise score of the event corresponding to the beginning of a pattern and the noise score of the event corresponding to the end of the pattern. This noise score is 1.0 for the event as shown in FIG. 8A, and 0.0 for the event as shown in FIG. 8B. That is, a greater noise score indicates a greater possibility of noise.

Next, the removal of a noise event using this noise score will be described. First, the noise score is calculated for all, events contained in the adjacent event graph, and an event having a noise score exceeding a preset threshold is recorded as a noise event. When one or more noise events are found, the adjacent event graph is reconstructed in the same manner as in step S501. However, at that time, the event recorded as a noise event is skipped during reading. Through this processing, the noise event (event having a noise score exceeding a preset threshold) is removed. The above-described processing is repeated until a new noise event is no longer found, and the removal of the noise event ends. In most cases, this iteration processing converges after several iterations, and thus will not have a significant impact on she computation time.

Figure 9A:
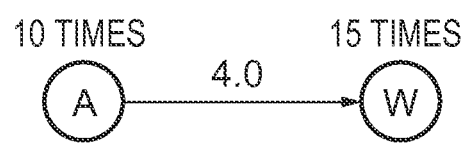
FIGS. 9A to 9C are diagrams showing exemplary noise links according to an embodiment.
Figure 9B:
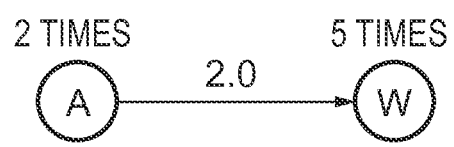
Figure 9C:
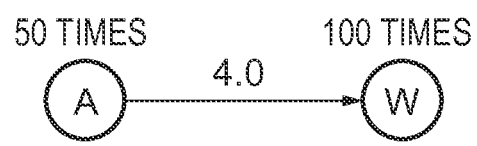

In step S503, the control unit 201 cuts, as a noise link, a directed link having an evaluation value smaller than or equal to a predetermined, value in the adjacent event graph, the evaluation value being obtained based on the weight of the directed link. The frequent pattern that is to be extracted needs to have a strong connection between events to a certain degree. Therefore, the control unit 201 uses, for example, the following two indices to determine a link having a weak connection, or in other words, a noise link, and removes the noise link. A first index is an absolute value of the link weight, and a second index is the ratio of the link weight to the number of event occurrences. Here, the number of event occurrences is the number of occurrences of one of two events connected to a link that has a smaller number of occurrences. Each of the first and second indices will be described with reference to FIGS. 9A to 9C. For example, assuming that a link having an absolute value of the link weight, which is the first index, of less than 4 is a noise link, FIG. 9B represents a noise link. Assuming that a link having a ratio of the link weight to the number of event occurrences, which is the second index, of less than 0.5 is a noise link, FIGS. 9A and 9C represent noise links. In practice, it is preferable to use these indices in combination. For example, assuming that a link having an absolute value of the link weight of less than 2, or having a ratio of the link weight to the number of event occurrences of less than 0.2 is a noise link, FIG. 9C is removed as the noise link.

In step S504, the control unit 201 estimates an event that is contained in a plurality of patterns in the adjacent event graph, and separates such an event so as to update the adjacent event graph. When an adjacent event graph is created by using only the front-to-back relation from an operation history, there is a problem in that, via an event contained in a plurality of patterns, these patterns are integrated into a single graph. For example, it is assumed that three patterns as shown in FIG. 10B, namely, event J→event K→event Z, event O→event Z→event P, event Z→event S→event T, are contained in a large number in an operation history. Then, if an adjacent event graph is created by the method according to the previous steps, a graph as shown in FIG. 10A appears, in which the three patterns that were originally separate are extracted as a single pattern. Thus, this step estimates an event contained in a plurality of patterns, and separates such an event. The present method will be described with reference to FIGS. 11A to 11C.

Figures 11A, 11B, 11C:
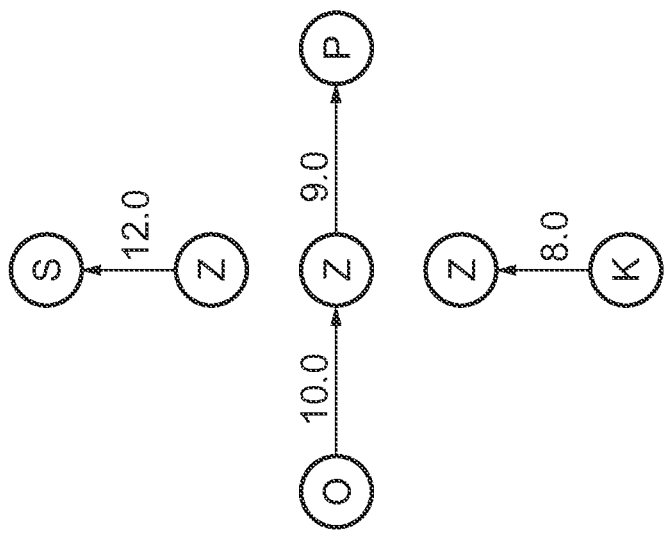
FIG. 11A to it are diagrams showing an example of event separation according to an embodiment.

The following processing is performed on all events in the adjacent event graph. Here, a description will be given, taking the event Z in FIG. 10A as an example. First, events connected to the event Z are extracted, and these events are regarded as an adjacent event set (adjacent node set). As shown in FIG. 11A, the adjacent event set of the event Z includes events K, O, P, and S. This adjacent event set is clustered using the co-occurrence as the similarity. As used herein co-occurrence is a representation of the likelihood that events co-occur at close times. FIG. 11B shows co-occurrence frequency information of the adjacent event pairs associated with the event Z. For example, the first row shows that the co-occurrence frequency of an event pair "O, P" is 9, indicating that either "event O→event Z→event P" or "event P→event Z→event O" is observed nine times. The co-occurrence frequency information of such an adjacent event pair associated with an event can be easily created at the time of creating the adjacent event graph in step S501.

From the co-occurrence frequency information of each adjacent event pair associated with the event Z, the similarity of the adjacent event pair is calculated as follows. Specifically, the value obtained by dividing the co-occurrence frequency of an adjacent event pair by a smaller one of the link weights between each of the events included in that adjacent event pair and the event Z is the similarity of the adjacent event pair. For example, the similarity of the adjacent event pair O, P is 9/Min(10.0, 9.0)=1.0.

The events included in the adjacent event set are grouped using such a similarity of the adjacent event pair. In the present embodiment, a clustering technique is used for such grouping. Note that clustering techniques are divided into two major groups, namely, hierarchical and non-hierarchical clustering techniques. Although either type is applicable to the present embodiment, the present embodiment uses a hierarchical clustering technique, for which the number of clusters need not be set in advance. Examples of the typical hierarchical clustering method include the shortest distance method, the longest distance method, the group average method, and the Ward system, and any of these methods may be used. Note that the description of these techniques has been omitted since they are not essential to the present invention. For example, in the examples shown in FIGS. 11A and 11B, the adjacent event set K, O, P, S is clustered into three clusters [(O, P), (K), (S)].

Finally, the event Z is separated using the clustered adjacent event set. Each of the clustered event, groups can be considered as an independent pattern, and thus the event Z is copied in the number of these event groups. Then, a link is reconnected with each of the event groups so as to close the link within the event group, thereby performing separation of the event Z. FIG. 11C shows the state after the separation has been performed. By performing the above-described processing on all events in the adjacent event graph, the original three patterns as shown in FIG. 10B can be finally obtained.

Figure 12:
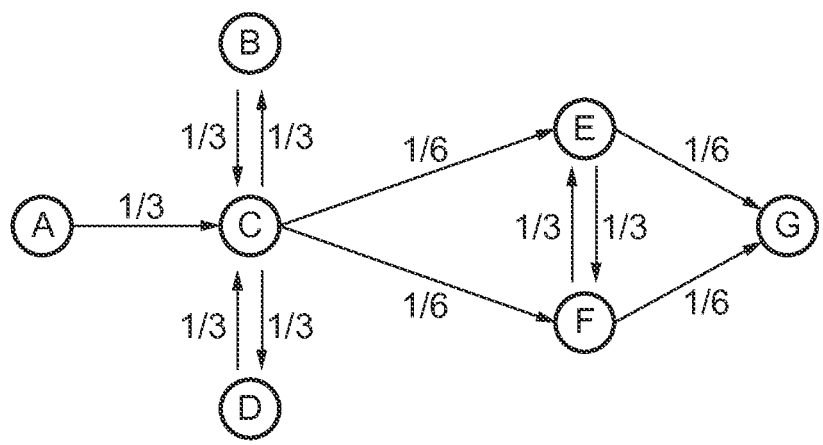
FIG. 12 is a diagram showing examples of an expected value of a link weight according to an embodiment.

In step S505, those events between which there is no order relation are searched for in the adjacent event graph, and they are combined. The reason for performing this will be described with reference to FIG. 12. For example, an event occurrence pattern such as A→(B, C, D)→(E, F)→G is considered. This pattern shows that B, C, and D occur in any order after A, and E and F occur in any order after all of B, C, and D have occurred, and G occurs after all of E and F have occurred. Here, FIG. 12 shows the probability of occurrence of events that occur before or after the event C. The events that may occur before the event C are three events, namely, the events A, B, and D, and the probability of occurrence of these events is all ⅓. The events that may occur after the event C are four events, namely, the events B, D, E, and F, and the probability of occurrence of each of the events B and D is ⅓, whereas the probability of occurrence of each of the events B and F is ⅙. The probabilities of occurrence correspond to the expected values of the respective link weights when the pattern A→(B, C, D)→(E, F)→G is observed one time. Accordingly, even if, for example, the pattern A→(B, C, D)→(E, F)→G is observed 12 times, the link weight of the link from the event. C to the event B or F can only expected to be 2. This results in the problem that these links tend to be determined as a noise link in step S502.

To deal with such a problem, in the present step, those events between which there is no order relation are searched for in the adjacent event graph, and she events are combined. Through this processing, of the links that have been broken as noise links in step S503, those links having a partially ordered relation are restored. First, the control unit 201 determines whether or not to combine two nodes having a directed link in both directions in the adjacent event graph, based on the weights of these directed links in both directions. Then, the control unit 201 combines the two nodes that have been determined to be combined into a single node, and updates the adjacent event graph by setting a directed link of the combined node using the weights of the directed links that the nodes respectively had to the adjacent node. A specific implementation example of this processing will be described with reference to FIGS. ISA, 13B, and 14A to 14C.

The following description will be given assuming that the pattern A→(B, C, D)→(E, F)→G is used and this pattern occurred in a certain number of times in an operation history. It is assumed that the adjacent event graph shown in FIG. 13A was obtained as a result of the processing up to step S502. Here, links 1601 indicated by the solid line show that the value of the link weight is large, and links 1602 indicated by the dashed line show that the value of the link weight is small. Removing noise links by step S503 from this adjacent event graph results in, for example, an adjacent event graph as shown in FIG. 13B, which does not represent the original pattern shown in FIG. 12. Therefore, all event pairs of the adjacent event graph are examined as to whether there is an order relation therebetween. Those event pairs that have been determined that there is no order relation therebetween are combined. It may be determined that there is an order relation between events, for example, if there is a link having a link weight greater than or equal to a threshold in both directions between events. Alternatively, taking into consideration the number of event occurrences, it may be determined that there is an order relation between events, if there is a link weight in both directions and the ratio of the link weight obtained by dividing the sum of the link weights in both direction by the number of event occurrences is greater than or equal to a threshold. Alternatively, both of the sum of the link weights in both directions and the ratio of the link weight described above may be used to determine the presence or absence of an order relation between events.

Figure 13A:
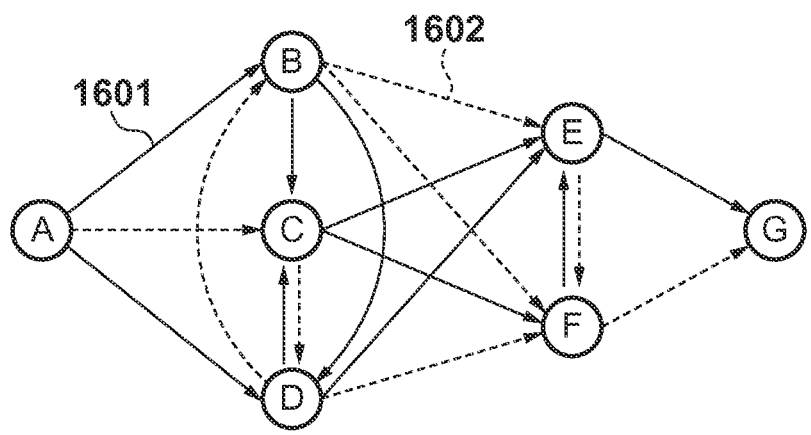
FIGS. 13A and 13B are diagrams illustrating a problem to be solved by the pattern extraction according to an embodiment.
Figure 13B:
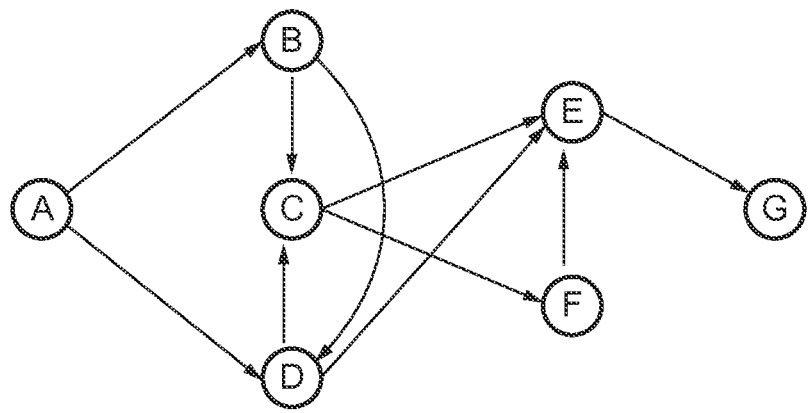
Figure 14A:
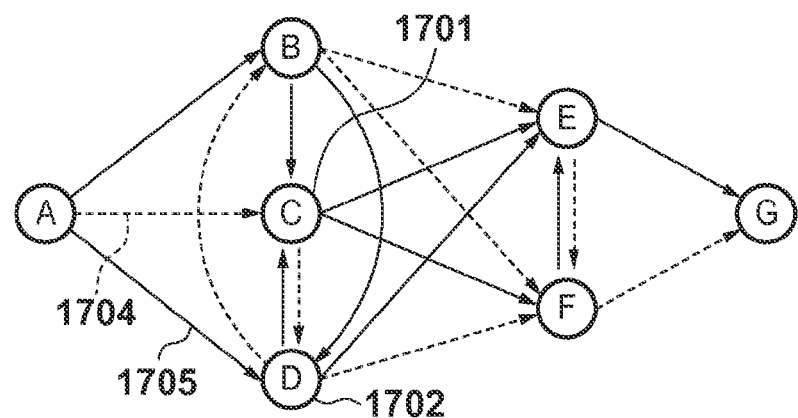
FIGS. 14A to 14C are diagrams showing examples of event combination according to an embodiment.
Figure 14B:
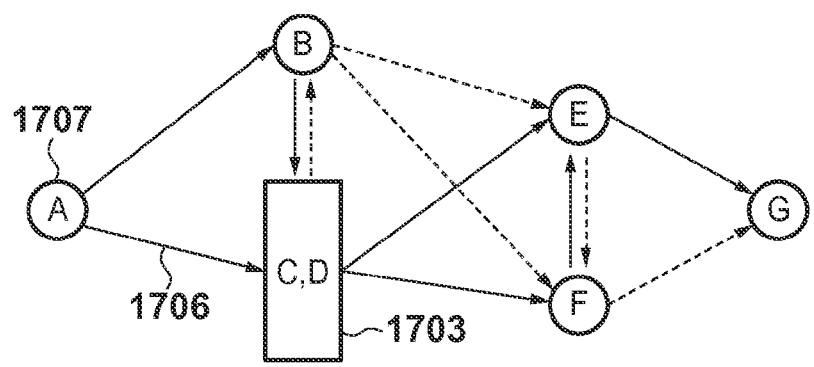

It is assumed that, in the adjacent event graph shown in FIG. 14A, which is equal to the adjacent event graph shown in FIG. 13A, an event C (1701) and an event C (1702) are found as an event pair between which there is no order relation, for example. In this case, by combining these events, an event C, C (1703) shown in FIG. 14B is obtained. As that time, the links with adjacent events are reconnected, and the sum of the link weights of links 1704 and 1705 before combining the events C and D is provided, as the link weight of a link 1706 from an event A (1707) to the event C, D (1703).

Figure 14C:
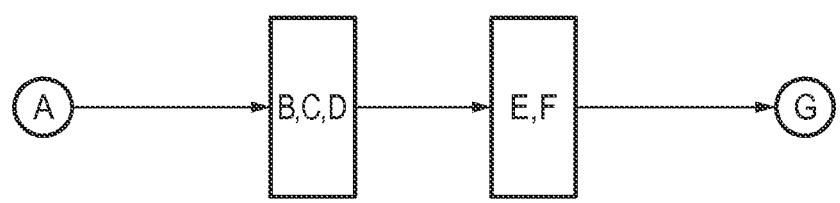

The above-described processing is repeated until an event pair between which there is no order relation is no longer found in the adjacent event, graph, and the processing of the present step ends. The number of iterations of this iteration processing is proportional to the size of a parallel sub-pattern included in a pattern, and in most cases, the processing converges within several iterations. Finally, the present step is performed from the state in FIG. 14A, and thereby the adjacent event graph shown in FIG. 14C is obtained. This represents the original pattern A→(B, C, D)→(E, F)→G.

The adjacent event graph obtained by performing the above-described processing from steps S501 to S505 is a frequent pattern that is finally extracted from the frequent pattern extraction unit 309.

The frequent pattern extraction method according to the first embodiment has been described thus far, taking, as an example, the extraction of a frequent pattern from a file operation history in a file management system. Thus, unlike conventional techniques that repeatedly perform generation of candidates for a pattern, scanning of data, and counting of the frequency, the present embodiment constructs a pattern directly from data. Accordingly, even if the number of event types and the length of the input event sequence are large, it is possible to extract a general episode at high speed. In testing, the pattern extraction according to the present embodiment operated more than 1000 times faster than that of a conventional technique. Note, however, that while the conventional technique extracts all patterns having a frequency greater than or equal to a minimum frequency determined by the user without omission, the present embodiment cannot ensure that there will be no omission, depending on the influence of noise or the like. The conventional technique, however, is problematic in that the number of patterns to be extracted tends to be huge although there is no omission. This becomes more pronounced when the minimum frequency is set to be low. The feature of the present embodiment lies in that it compromises such omission to a certain degree, and extracts an appropriate number of highly accurate patterns at high speed.

The frequent pattern extracted by the above-described processing can be utilized for improving work efficiently. For example, the frequent pattern may be visualized to help reviewing business operations, to serve as a reference for establishing a workflow system, or to recommend a file navigating the user's file operation. Further, examples of the utilization of the frequent pattern extraction are not limited to the present example. As other examples, the frequent pattern extraction is widely applicable to processing for handling time-series data, including the detection of the cause of a failure from a failure log at a factory, the prediction of user behavior from a Web operation history, the analysis of seismic data, the detection of intrusion, and operational assistance based on an operation history of an imaging apparatus or a printing apparatus.

Second Embodiment

In the first embodiment, a file operation is regarded as an event, and the time-series data to be analyzed contains the type and the time of occurrence of an event. In the second embodiment, a description will be given of utilization in the case where the time-series data does not contain the time of occurrence. In this case, during the generation of an adjacent event graph in step S501, the link weight between events may be set to a fixed value (e.g., 1.0). That is, it may be assumed that there is a uniform correlation between adjacent events, regardless of the gap time between the times of occurrence of the events. As input data increases, events that are adjacent to each other many times have a greater link weight and thus can be assumed to have a high correlation. Varying the link weight according to the gap time seems to be effective when the amount of data is small. Accordingly, for example, during creation of an adjacent event graph, a time-dependent link weight may be used when the number of accumulated data is smaller than a predetermined threshold, and a link weight having a fixed value may be used when the number of accumulated data is greater than or equal to the predetermined threshold.

Further, one possible method for determining the link weight, without using the gap time, is the use of attribute information of an event. For example, when a file operation is regarded as an event, a file name, a creator, a creation date-time, and the like can be used as the attribute information. A correlation may be obtained from such attribute information, and the link weight is increased when there is a strong correlation. In this way, to determine the link weight, the correlation between events may be determined according to available information such as the time of occurrence, the attribute information and the like of an event, and the determined correlation may be reflected.

Third Embodiment

Although the entire processing from steps S501 through S505 is performed in the first embodiment, the entire processing may not necessarily be performed. For example, steps S502, S504, and S505 may be omitted, and the frequent pattern may be extracted by performing step S501 (creation of an adjacent event graph) and step S503 (cutting of a noise link). In this case, the other steps (steps S502, S504, S505) may be appropriately selected in view of data to be analyzed and the feature of a pattern that is predicted to be contained in that data in that case, it is possible to allow the user to specify whether or not to perform the processing of each of steps S502, S504, and S505, or to allow the control unit 201 to set whether or not to automatically perform such processing based on analysis of time-series data.

For example, when data to be analyzed contains many noises, it is preferable to perform the removal of a noise event in step S502. Further, when a single event is contained in a plurality of patterns as a predicted pattern, it is preferable to perform the event separation of S504. When, as a predicted pattern, many of events contained in a pattern have a partially ordered relation, it is preferable to perform the event combination of step S505. Note that steps S502, S504, and S505 result in a relatively small reduction in accuracy or a relatively small increase in computation time when these steps are performed. Thus, if data to be analyzed and the feature of a pattern that is predicted to be contained in that data are unknown, it is preferable to perform the entire processing from steps S501 through S505 as in the first embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent. Application No. 2013-003111, filed Jan. 11, 2013, which is hereby incorporated by reference herein in its entirety.

What is claimed is:

1. A pattern extraction apparatus for extracting a pattern of event transitions from event time-series data relating to operations in a file system, comprising:
   one or more processors; and
   one or more memories storing instructions that, when executed by the one or more processors, cause the pattern extraction apparatus to:
      acquire operation information relating to operations performed by a computer terminal in the file system in response to user input to the computer terminal;
      store the operation information as the event time-series data, the event time-series data having a plurality of different types of events in an operation history database;
      generate an adjacent event graph by fetching, from the operation history database, adjacent events from the event time-series data, representing each of the adjacent events as a node, connecting the nodes by a directed link, which has a direction based on a direction of a transition between the adjacent events and a weight based on a weight of the transition between the adjacent events, and representing identical events as a single node, wherein, if there are a plurality of transitions between the adjacent events, the weight of the directed link between the adjacent events is obtained by accumulating weights of the plurality of transitions;
      set the weight of the directed link between the adjacent events based on a time period of at least one transition between the adjacent events in the event time-series data when a number of stored data of the adjacent events is less than a predetermined value, and set the weight of the directed link between the adjacent events to a predetermined fixed value when the number of stored data of the adjacent events is not less than the predetermined value;
      extract a pattern of event transitions from the event time-series data based on weights of directed links in graphical representation form;
      determine a recommended user input based on the extracted pattern; and
      transmit, to the computer terminal, a message including the recommended user input to cause an operation in the file system to be performed by the computer terminal.

2. The apparatus according to claim 1, wherein the one or more memories store further instructions that, when executed by the one or more processors, cause the pattern extraction apparatus to:
   classify a plurality of nodes connected to a certain node in the adjacent event graph into a plurality of groups based on co-transition of the plurality of nodes,
   form a plurality of patterns using the plurality of groups and the certain node; and
   update the transition of the adjacent event graph based on the formed plurality of patterns.

3. The apparatus according to claim 1, wherein the one or more memories store further instructions that, when executed by the one or more processors, cause the pattern extraction apparatus to:
   calculate, for each of the nodes of the adjacent event graph, a noise score based on the weight of the transition to which the node is connected; and
   remove a node that has been determined to be noise according to the calculated noise score and reconstruct the adjacent event graph.

4. The apparatus according to claim 1, wherein the one or more memories store further instructions that, when executed by the one or more processors, cause the pattern extraction apparatus to:
   determine whether or not to combine two nodes having a directed link in a forward direction and a directed link in a backward direction between the two nodes in the adjacent event graph based on a weight of the directed link in the forward direction and a weight of the directed link in the backward direction; and
   combine the two nodes that have been determined to be combined into a single node, and update the adjacent event graph by setting a directed link between the combined node and a node adjacent to the two nodes using weights of directed links between the adjacent node and the two nodes.

5. A method for controlling a pattern extraction apparatus for extracting a pattern of event transitions from event time-series data relating to operations in a file system, comprising:
   acquiring operation information relating to operations performed by a computer terminal in the file system in response to user input to the computer terminal;
   storing the operating information as the event time-series data, the event time-series data having a plurality of different types of events in an operation history database;
   generating an adjacent event graph by fetching, from the operation history database, adjacent events from the event time-series data, representing each of the adjacent events as a node, connecting the nodes by a directed link, which has a direction based on a direction of a transition between the adjacent events and a weight based on a weight of a transition between the adjacent events, and representing identical events as a single node, wherein, if there are a plurality of transitions between the adjacent events, the weight of the directed link between the adjacent events is obtained by accumulating weights of the plurality of transitions;
   setting the weight of the directed link between the adjacent events based on a time period of at least one transition between the adjacent events in the event time-series data when a number of data is less than a predetermined value;
   setting the weight of the directed link between the adjacent events to a predetermined fixed value when the number of data is not less than the predetermined value;
   extracting a pattern of event transitions from the event time-series data based on weights of directed links in graphical representation form;
   determining a recommended user input based on the extracted pattern; and
   transmitting, to the computer terminal, a message including the recommended user input to cause an operation in the file system to be performed by the computer terminal.

6. A non-transitory computer-readable memory storing a program for causing a computer to execute a pattern extraction method for extracting a pattern of event transitions from event time-series data relating to operations in a file system, the method comprising;

acquiring operation information relating to operations performed by a computer terminal in the file system in response to user input to the computer terminal;

storing the operating information as the event time-series data, the event time-series data having a plurality of different types of events in an operation history database;

generating an adjacent event graph by fetching, from the operation history database, adjacent events from the event time-series data, representing each of the adjacent events as a node, connecting the nodes by a directed link, which has a direction based on a direction of a transition between the adjacent events and a weight based on a weight of the transition between the adjacent events, and representing identical events as a single node, wherein, if there are a plurality of transitions between the adjacent events, the weight of the directed link between the adjacent events is obtained by accumulating weights of the plurality of transitions;

setting the weight of the directed link between the adjacent events based on a time period of at least one transition between the adjacent events in the event time-series data when a number of data is less than a predetermined value;

setting the weight of the directed link between the adjacent events to a predetermined fixed value when the number of data is not less than the predetermined value;

extracting a pattern of event transitions from the event time-series data based on weights of directed links in graphical representation form;

determining a recommended user input based on the extracted pattern; and transmitting, to the computer terminal, a message including the recommended user input to cause an operation in the file system to be performed by the computer terminal.

7. The apparatus according to claim 1, wherein the one or more memories store further instructions that, when executed by the one or more processors, cause the pattern extraction apparatus to cut a directed link between a first node and a second node, having an evaluation value smaller than or equal to a predetermined value in the adjacent event graph, the evaluation value being obtained based on a weight of the directed link between the first node and the second node.

8. The apparatus according to claim 7, wherein the evaluation value used in the cutting of the directed link between the first node and the second node is the weight of the directed link between the first node and the second node in the adjacent event graph, a ratio of the weight of the directed link between the first node and the second node to a number of transitions between the first node and the second node, or a score obtained by combining both the weight and the ratio of the directed link between the first node and the second node.

9. The apparatus according to claim 1, wherein the one or more memories store further instructions that, when executed by the one or more processors, cause the pattern extraction apparatus to display the pattern of event transitions as a workflow for the event time-series data.

* * * * *